Patented Dec. 20, 1938

2,140,560

UNITED STATES PATENT OFFICE 2,140,560

METHOD OF PRODUCING MOLDING COMPOSITIONS

Leonard Smidth, New York, N. Y., assignor to Luco Products Corporation, Brooklyn, N. Y., a corporation of Delaware No Drawing. Application May 16, 1931, Serial No. 537,998. Renewed May 7, 1936

6 Claims. (Cl. 260—39)

In the preparation of a molding composition from urea and formaldehyde, it has been heretofore difficult to control the extent of the reaction or the "flow" of the composition in the mold because of the varying amount of catalyst, the varying temperature, the time used in drying, etc.

I have discovered a method whereby a uniform condensation product of great strength and durability may be obtained in a very simple way, which method consists in producing a molding composition by the reaction of urea and formaldehyde at a temperature below boiling, preferably below 75° C. This is done by carrying out the greater part, or all, of the reaction between urea and formaldehyde in the presence of a filler during the drying process. The advantage of this method is that the urea-formaldehyde condensation product is in the form of a thin liquid, which is easily mixed with the filler, as, for instance, paper. This is not true of the viscous and gelatinized products prepared in accordance with prior practice. If paper is used and it is impregnated with the thin liquid, the moist paper is very absorbent of the thin liquid and can then be very readily broken up and dried without any expensive mixing or masticating process. This process is especially adapted for use in laminated work, as the solution of the urea and formaldehyde can be used to impregnate sheets of material and the reaction is carried on during the drying process. The dried sheets are then molded together under heat and pressure. Another advantage of this process is that the reaction is carried on in such a way that a more potentially reactive mixture can be used, i. e. a more acidic solution of urea and formaldehyde, or more catalyst can be present. By using the same solutions which are acid and those which contain a large amount of catalyst and carrying on the reaction the way it has been disclosed in previous patents, i. e. by heating to boiling, the reaction would be very violent, and hard or viscous condensation products are obtained. These condensation products could be mixed with fillers only with difficulty, and they would be very difficult to mold. Another advantage of this process is that during the drying process, the heat generated by the reaction helps in evaporating the water and thus cuts down the time of drying. Then too, by carrying out the reaction during the drying process, water is taken off as the reaction proceeds and it appears that the less water present the more stable in flowing characteristics the composition remains during the drying process, whereby molding compositions stable in flowing qualities are obtained. Instead of paper, I can use other cellulose fillers such as cotton, cotton cloth, silk, rayon, canvas, sawdust, wood flour, etc.

Example 1.—I have made a urea-formaldehyde mixture in the mole ratio of 1.25 to 2 respectively, with ammonia or other bases added to bring the hydrogen ion concentration of the solution to pH of 6.5 and have held this solution at about 30° C. for about thirty minutes. The formaldehyde used (commercial formalin) was in the form of a solution containing 40% by volume. The solution, in the form of thin liquid, was then mixed with paper (alpha fibre in sheet form) to give 40% on the dry weight and subjected at once to a stream of dry air for some hours at normal temperature. When sufficient water was removed the material was heated to a higher temperature until dry. In this way the water of the formalin solution was first removed and then the water formed during the condensation reaction was removed as the same was formed. By this procedure gelatinization is avoided and a molding composition stable in flowing characteristics is obtained. I found that material so produced is uniform in its properties.

Example 2.—The same proportional mixture as above was used but no basic substances were added in order to change the acidity of the formaldehyde with an original pH of 3.0. The pH of the solution on the addition of the urea was 4.6. This was then mixed with the alpha fibre paper and dried as above. The presence of the unneutralized acid caused a quicker curing action when subjected to heat and pressure.

The composition was finally subjected in the mold to the action of heat and pressure. The high temperature, say between 125° and 145° C., continued the process that was retarded by the low temperature of the preparation process described.

Although the novel procedure of the present invention is independent of the particular proportions and acidity conditions employed, the advantages of the invention are not obtained to any satisfactory degree at proportions outside of the range of 1.05 to 1.40 moles of urea to 2 of formaldehyde or at acidities outside of the range of pH 4.6 to pH 6.5.

The above procedure yields a uniform product that is high in final infusible insoluble material and low in free formaldehyde, both of which are factors that determine the strength and the resistance to water absorption.

This is a continuation in part of my application Serial No. 429,202, filed February 17th, 1930, in which it is disclosed how urea and formaldehyde are reacted in the presence of acid forming substances at a temperature below 100° C. to produce a molding composition while the present application concerns the process of manufacturing a molding composition from urea and formaldehyde by mixing or slightly reacting them together at a low temperature, mixing them with a cellulose material, as paper, and simultaneously carrying out the reaction and drying process, which process is not necessarily in the presence of an acid forming substance.

What I claim is:

1. In the process of manufacturing urea-formaldehyde molding compositions, the steps which comprise substantially removing the water present from the primary reaction product of urea and an aqueous solution of formaldehyde while in admixture with a filler, the primary reaction product being obtained by reacting at a temperature below boiling, and before drying not having been reacted to the point where there is substantial change in the viscosity of the solution, then simultaneously reacting and drying, such that the water of reaction is removed as it is formed, whereby the condensation reaction is substantially completed during the drying process and a dry, stable, fusible molding composition obtained.

2. In the process of manufacturing urea-formaldehyde molding compositions, the steps consisting in reacting urea with aqueous formaldehyde solution at a temperature below boiling, substantially removing the water present from the resulting thin liquid having a viscosity not substantially greater than that which is produced by reacting urea and formaldehyde solution in a molar ratio of 1.25:2, respectively at a pH of 6.5 at about 30° C. for about 30 minutes while in admixture with a cellulose filler, by the use of a stream of air and then further drying the reaction mass while simultaneously reacting, the water of reaction being removed as formed, whereby the condensation reaction is substantially completed during the drying process and a dry, stable, fusible molding composition obtained.

3. The process of producing urea-formaldehyde molding compositions comprising reacting urea and formaldehyde in the molar ratio of 1.25 to 2, respectively, at a pH value of about 6.5 at a temperature of about 30° C. for about 30 minutes, mixing the resulting solution with a cellulose filler and simultaneously reacting and drying the resulting mass whereby the water is taken off as the reaction proceeds, thereby producing a stable molding composition having uniform properties and good flowing qualities, the same being capable of hardening into an infusible insoluble material by the application of heat.

4. In the production of urea-formaldehyde molding compositions, the steps consisting in reacting urea and formaldehyde solution in a molar ratio of from 1.05 to 1.40 mols of urea to 2 mols of formaldehyde at a pH value of between about 4.6 and 6.5, at a temperature below boiling for a period adapted to produce a thin liquid having a viscosity not greater than that which is produced by reacting urea and formaldehyde solution in a molar ratio of 1.25 to 2, respectively, at a pH value of 6.5 at about 30° C. for about 30 minutes, substantially removing the water present and then simultaneously reacting and drying said mass while the same is supported upon a cellulose filler, the water of the condensation reaction being removed as it is formed, whereby the condensation reaction is substantially completed during the drying process and a dry, stable, fusible molding composition obtained.

5. In the production of urea-formaldehyde molding compositions, the combination of steps consisting in reacting urea and aqueous formaldehyde solution at a temperature below boiling to form a reaction solution having a viscosity not appreciably greater than that which is produced by reacting urea and formaldehyde solution in a molar ratio of 1.25 to 2, respectively, at pH value of 6.5 at about 30° C. for about 30 minutes, whereby a reaction mass is produced in the form of a thin liquid, substantially removing the water present from said thin liquid while the same is supported on a cellulose filler to form a uniformly impregnated molding composition and then simultaneously reacting and drying said mass, the water of the condensation reaction being removed as it is formed, whereby the condensation reaction is substantially completed during the drying process and a dry, stable, fusible molding composition obtained.

6. In the production of urea-formaldehyde condensation products the steps consisting in reacting urea and formalin in the molar ratio of 1.25 to 2, at a pH value of from 4.6 to 6.5 at a temperature below boiling, substantially removing the water present from the solution obtained while still a thin liquid and in admixture with cellulose, then simultaneously drying and reacting the resulting mass to remove water of reaction as formed, whereby the condensation reaction is substantially completed during the drying process and a dry, stable, fusible molding composition obtained, and finally subjecting the dried material in a mold to the action of heat and pressure whereby there is produced a final, infusible, insoluble reaction product of urea and formaldehyde.

LEONARD SMIDTH.